United States Patent
Bakker et al.

(10) Patent No.: US 6,775,472 B2
(45) Date of Patent: Aug. 10, 2004

(54) RADIANT ENERGY DEVICE FOR SHRINKING A THIN FILM

(75) Inventors: William J. Bakker, Orangeville (CA); Larry Gunseor, Madison, WI (US)

(73) Assignee: Green-Line Products Inc., Mississauga (CA)

( * ) Notice: Subject to any disclaimer, the term of this patent is extended or adjusted under 35 U.S.C. 154(b) by 0 days.

(21) Appl. No.: 10/180,863

(22) Filed: Jun. 26, 2002

(65) Prior Publication Data

US 2003/0026602 A1 Feb. 6, 2003

(51) Int. Cl.⁷ .............................. B65B 53/02; H05B 3/00
(52) U.S. Cl. ....................... 392/411; 392/407; 392/419; 392/426; 219/477; 219/541; 53/373.8; 53/442; 53/477; 156/272.2
(58) Field of Search ................. 392/411–415, 418, 392/426, 419–421, 407, 416, 408; 219/476, 477, 480, 385, 541; 156/272.2; 34/266, 268–269; 53/442, 477, 373.7, 373.8, 377.7

(56) References Cited

U.S. PATENT DOCUMENTS

| | | | | |
|---|---|---|---|---|
| 2,355,459 A | * | 8/1944 | Miskella | 34/266 |
| 3,345,798 A | | 10/1967 | Sternau | |
| 3,423,901 A | * | 1/1969 | Peppler | 53/442 |
| 3,494,098 A | | 2/1970 | Sternau | |
| 3,509,683 A | | 5/1970 | Sternau | |
| 3,581,458 A | * | 6/1971 | Gustavsson | 53/442 |
| 3,591,767 A | * | 7/1971 | Mudie | 219/244 |
| 3,710,550 A | * | 1/1973 | Osborne | 392/415 |
| 3,760,154 A | | 9/1973 | Konger | |
| 3,810,343 A | * | 5/1974 | Palomo | 426/234 |
| 4,024,009 A | * | 5/1977 | Amsden et al. | 156/272.2 |
| 4,025,378 A | * | 5/1977 | Amsden et al. | 156/275.1 |
| 4,260,567 A | * | 4/1981 | Poppe et al. | 264/492 |
| 4,325,762 A | * | 4/1982 | Burmeister et al. | 156/272.2 |
| 4,892,997 A | * | 1/1990 | McWilliams | 219/461 |
| 5,328,210 A | | 7/1994 | Stafford et al. | |
| 5,511,360 A | | 4/1996 | Bakker et al. | |
| 6,226,454 B1 | * | 5/2001 | Couture | 392/419 |
| 6,426,486 B1 | * | 7/2002 | Bartok | 219/405 |
| 2003/0015274 A1 | * | 1/2003 | Mallman et al. | 156/272.2 |
| 2003/0019188 A1 | * | 1/2003 | Biba et al. | 53/442 |

FOREIGN PATENT DOCUMENTS

| | | | | |
|---|---|---|---|---|
| DE | 2323000 | * | 12/1973 | |
| DE | 4217520 | * | 12/1993 | |
| EP | 510 803 | | 10/1992 | |
| EP | 952084 | * | 10/1999 | |
| GB | 1523023 | * | 8/1978 | 392/411 |
| JP | 54-130291 | * | 10/1979 | |
| JP | 4-114847 | * | 4/1992 | |
| JP | 5-42918 | * | 2/1993 | |

* cited by examiner

*Primary Examiner*—John A. Jeffery
(74) *Attorney, Agent, or Firm*—Fay, Sharpe, Fagan, Minnich & McKee, LLP

(57) ABSTRACT

A radiant energy device for shrinking a thin film onto an open top of a container, the radiant energy device comprising: a source of power, to provide power to the radiant energy device; a plurality of fixed energy-emitting units, each of the units when energized being configured to emit radiant energy towards the shrinking film on said open top of the container; and a switching means, operatively connected between the source of power and each of the energy-emitting units, to independently activate at least two groups of the energy-emitting units; wherein, a first group of the energy-emitting units partially shrinks the thin film onto the container, and a second group finishes the shrinking.

11 Claims, 2 Drawing Sheets

RADIANT ENERGY DEVICE FOR SHRINKING A THIN FILM

FIELD OF THE INVENTION

This invention relates to the general field of radiating energy devices, and more particularly to a device that radiates energy to shrink a thin film.

BACKGROUND OF THE INVENTION

Presently in the fast food drink industry it is typical to serve a drink in a paper, plastic or other disposable cup topped with a preformed plastic lid. However, there are a number of problems associated with the use of these plastic lids including high cost, a bulky size leading to difficulties in storage and disposal, leakage, and non-hygienic handling. In order to overcome these problems various devices and methods have been proposed in which a cover is placed on an open-topped container and then heated to shrink it into sealing engagement with the top of such a container.

One approach is provided in U.S. Pat. No. 5,511,360 to Bakker. This patent teaches a housing to receive and position the disposable cup. A thin film cut in a generally circular shape is urged across the open top of the cup, with an edge portion draping over the periphery. A first radiant energy source directs radiant energy to this overhanging portion. There is an energy absorbing means to absorb the energy and communicate it to the overhanging portion, causing it to shrink and form a seal around the periphery of the open top of the cup. Subsequently a second radiant heater shrinks the top portion of the thin film, completing the seal.

The first radiant energy source taught in the patent comprises two or more heaters, preferably tungsten halogen lamps, that are mounted on pivot arms and connected by slip rings and other complicated mechanical links back to a drive belt and a dedicated motor. Each lamp is only capable of directing energy towards a small portion of the film. Accordingly, the lamps must be rotated about the open top to ensure a complete seal. Application of the first radiant energy therefore involves positioning the lamps closely adjacent to the draped over edge of the thin film, activating the motor to rotate the lamps, and activating the lamps themselves to emit heat energy.

While this method effectively delivers the radiant energy, it requires many extra components and involves many moving parts, adding to the expense and complexity of the equipment. Further, since only a portion of the shrink film is exposed by the rotating lamps at any given moment of the process, the lamps need time to expose the full periphery of the container. In the "fast food" industry, time in seconds or even fractions of seconds are important. Thus the extra time required to rotate the lamps, as well as the cost and complexity of the equipment needed to support and operate the lamps is a disadvantage.

SUMMARY OF THE INVENTION

What is required is a radiant energy device for shrinking a thin film which overcomes the problems associated with the current devices.

Most particularly, the device should be relatively simple and uncomplicated, and preferably have only a few or no moving parts to minimize overall cost and maintenance requirements. The device should perform the task of shrinking the thin film and completing the seal as quickly as possible to accommodate the productivity demands of the food service industry.

The device of the present invention accomplishes these ends by arranging a lamp or lamps in a fixed position about the open top of the container, rather than by rotating them in space. In one embodiment an array of single lamps are positioned around the periphery of the open top end of the container. A switching means is included to energize the lamps in a patterned sequence to reduce peak energy consumption. In another embodiment a single lamp combined with a directing means is used to direct the radiant energy from a fixed position.

Accordingly, there is provided a radiant energy device for shrinking a thin film onto an open top of a container, said radiant energy device comprising:

(a) a source of power, to provide power to said radiant energy device;

(b) a plurality of fixed energy-emitting units, each of said units when energized being configured to emit radiant energy towards said shrinking film on said open top of said container; and (c) a switching means, operatively connected between said source of power and each of said energy-emitting units, to independently activate at least two groups of said energy-emitting units;

wherein, a first group of said energy-emitting units partially shrinks said thin film onto said container, and a second group finishes said shrinking.

In a further embodiment there is also provided a radiant energy device for shrinking a thin film onto an open top of a container, said radiant energy device comprising:

(a) a source of power, to provide power to said radiant energy device;

(b) an energy-emitting body, said body emitting radiant energy upon being energized by said source of power; and (c) a directing means defining an opening, said directing means being sized and shaped to direct said emitted radiant energy continuously about a periphery of said opening;

wherein, upon said energy-emitting body being energized, said directed radiant energy shrinks said thin film to cover said open top of said container.

In a further embodiment there is also provided a radiant energy device for activating a shrinking thin film to cover an open top of a container, comprising:

(a) a variable source of power, to provide power to said radiant energy source;

(b) a plurality of energy-emitting units, each of said units being configured to emit enough radiant energy towards said open top of said container at a high power level to cause said film to shrink, and to emit a low enough amount of radiant energy at a low power level to not cause said film to shrink; and (c) a switching means, operatively connected between said source of power and each of said energy-emitting units, to switch said source of power between said high power level and said lower power level;

wherein, upon switching from said low power level to said high power level causes less of a power surge than switching said power level from off to said high level.

BRIEF DESCRIPTION OF THE DRAWINGS

Reference will now be made, by way of example only, to preferred embodiments of the invention as illustrated in the attached figures.

DETAILED DESCRIPTION OF THE PREFERRED EMBODIMENTS

Figure 1:
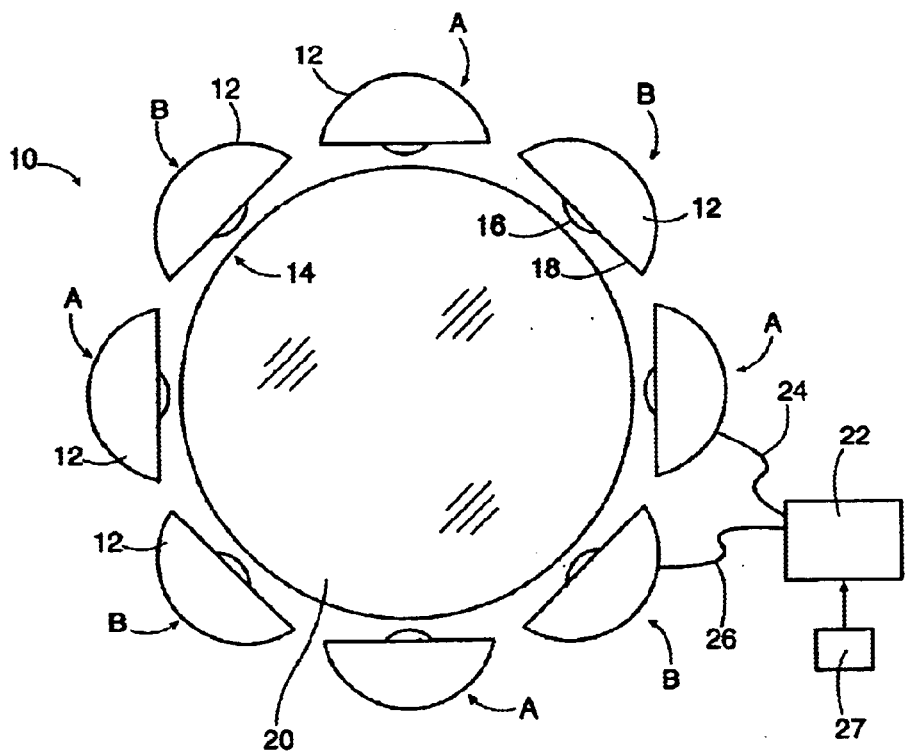
FIG. 1 is a top view of the radiant energy device for shrinking a thin film of the present invention, where the energy device is an array of lamps.

FIG. 1 shows a radiant energy device 10 of the present invention in the form of a plurality of individual energy-emitting units or light-emitting lamps 12. The lamps are maintained in a fixed position around the outer periphery of the open top of a container 14. It can be appreciated that the fixed position of the array of lamps 12 define an aperture in space that permits the entry of the container 14. The container 14 may be a paper or plastic cup of the type commonly used to dispense drinks in a restaurant, vending machine, or other food service environment. Each lamp 12 comprises a bulb 16 and a curved reflective surface or reflector such as a mirror 18 that directs radiant energy emitted by the bulb 16 towards the container 14. A thin film 20 stretches across the open top of the container 14 and overhangs the outer edge of container 14. The curved surface 18 is sized and shaped to distribute radiant energy across a segment of the thin film 20 to be sealed, and at least sufficiently to cause shrinkage where it impacts the thin film 20. Preferably the radiant energy is evenly distributed across the target segment, but the invention will work as long as enough radiant energy is provided to shrink the thin film 20 within the desired time frame.

A switching means 22 is represented functionally as a controller operatively connected to each of the lamps 12. Each lamp is designated as a member of a group of lamps "A" or "B". It can be appreciated that a control wire 24 from switching means 22 is operatively connected to each of the designated "A" lamps, while a control wire 26 is similarly connected to each of the designated "B" lamps. The switching means 22 is preferably implemented as part of an electronic control circuit that is generally an element of the broader lid-forming device. A source of power 27 supplies power to the radiant energy device 10 of the present invention. When power is provided to an energy-emitting unit, the unit is energized and emits radiant energy towards the thin film 20, causing the targeted portion of film to shrink.

Figure 2:
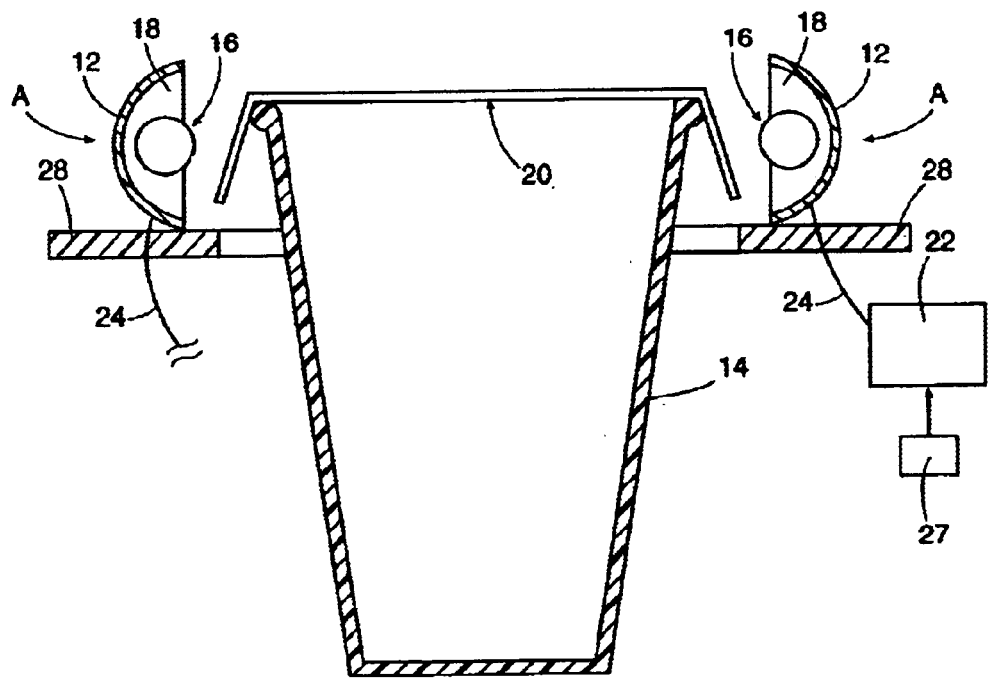
FIG. 2 is a cross-sectional view of the radiant energy device of FIG. 1, showing the container and shrink film covering the container.

FIG. 2 shows the same device 10 of FIG. 1 in a side cross-sectional view. In this view the thin film 20 and the overhang over the edge of the container 14 may be more clearly seen. Two of the lamps 12 are shown connected through control wire 24 to controller 22. Also shown is a support structure 28 associated with the broader lid-forming device, such as the one described in U.S. Pat. No. 5,511,360 to Bakker. In this figure the thin film 20 is shown just before it is to be shrunk around the rim of the container 14.

Each of the energy-emitting units or lamps 12 is in approximately the same position in space relative to the rim of the container 14 as each rotating first radiant energy source was in the Bakker patent described above. The units 12 are also preferably tungsten halogen lamps in the range of 200–300 watts, though it can be appreciated that other energy-emitting units which produce sufficient radiant energy may also be used. In particular, it can be appreciated that such energy-emitting units may also be used as long as the thin film 20 is sensitive to and shrinks in response to the particular type or frequency of radiation energy emitted.

A plurality of eight lamps 12 are shown in FIG. 1 as that number has provided adequate results. It can be appreciated that a plurality of 4, 6, or more than 8 lamps 12 may also be feasible. An even number of lamps 12 is convenient to accommodate switching between at least two groups, as discussed below, but is not a requirement and an odd number of lamps 12 may also be used.

Since the lamps 12 of the present invention are fixed in position rather than rotating as in the prior art, there will generally be a greater concentration of energy adjacent to the container 14. Further, the edge of the thin film 20 around the periphery of container 14 may be exposed to varying amounts of radiation depending upon how close a portion is to a lamp 12. However, it is a general characteristic of the shrinking-type thin film 20 that it will shrink up to a designated percentage amount, typically about 50%. Accordingly, the risk of any portion of the thin film 20 "overshrinking" from exposure to a nominally greater amount of radiation is measurably reduced.

The present invention comprehends activating only a portion of the plurality of lamps 12 at one time, to ensure that peak consumption of power drawn from the power source 27 does not exceed an optimum value. Generally the optimum value is 15 amps at 110 volts, though it can be appreciated that other optimum power levels may be desired, for which individual lamp power values may be adjusted accordingly. For example, in FIG. 1 the designated "A" lamps may be turned on for ½ second and turned off, whereupon the designated "B" lamps will immediately follow for ½ second. The switching means 22 is operatively connected between the source of power 27 and the energy-emitting units 12, and controls the switching between groups of lamps 12 and the on/off activation time period. The switching means 22 thereby independently activates each of the groups of lamps.

It can be appreciated that by energizing the array of lamps 12 in a patterned sequence, a plurality of lamps 12 fixed in position can be used in this application without exceeding the peak power consumption demanded by the rotating lamps of the prior art.

Peak power consumption is significantly influenced by the instantaneous turning on and off of the lamps 12. Accordingly, another means of energizing the array of lamps 12 of the present invention involves maintaining a constant low power output or current level, or trickle of current, through all of the lamps 12, and then fully energizing all of the lamps 12 simultaneously with a high power level when it is desired to shrink the thin film 20. The power source 27 would accordingly provide variable power levels. The low current level would be selected to be sufficiently low so as not to cause any shrinkage of thin film 20. Since in this embodiment the full power would be reached starting from a low level of current rather than zero current, the peak power demand or surge would be measurably reduced in comparison with energizing all of the lamps 12 from an off or zero power level. Accordingly, in this embodiment the switching means 22 would switch all of the lamps 12 from a low power level to a full power level. The lamps 12 would not need to be designated into discrete groups, and all of the lamps 12 could be controlled from a single control wire.

Figure 3:
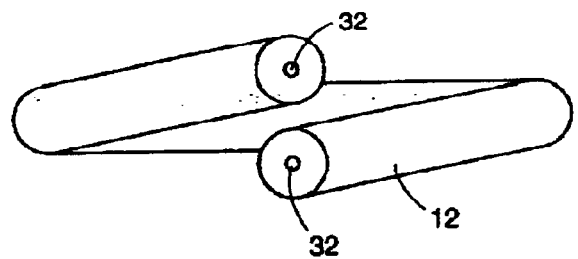
FIG. 3 is a front view of another embodiment of the radiant energy device of the present invention, where the device is a single lamp and the view is at the input ends of the lamp.
Figure 4:
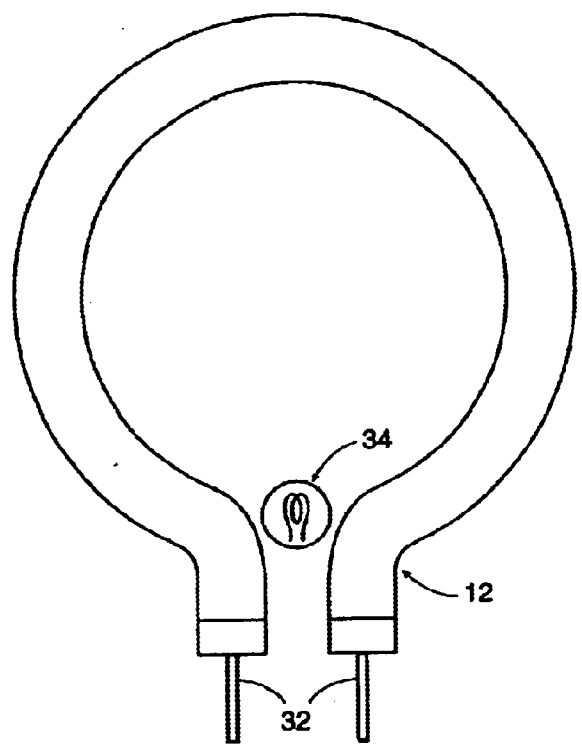
FIG. 4 is a top view of another embodiment of the radiant energy device of the present invention, where the device is a single lamp.
Figure 5:
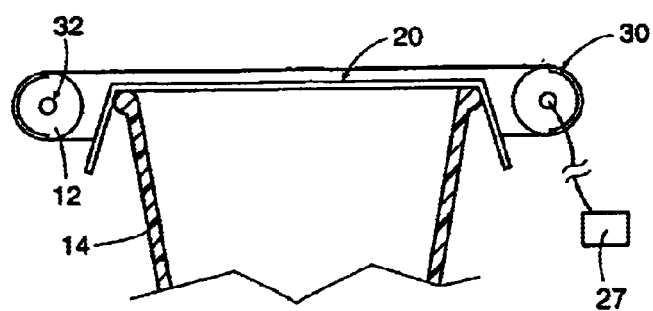
FIG. 5 is a cross-sectional view of the single lamp embodiments of FIGS. 3 and 4, further showing the container, the shrink film covering the container, and a reflection coating inside the lamp.

FIGS. 3, 4, and 5 show a second embodiment of the present invention. In this embodiment a single fixed radiant energy-emitting body such as a light-emitting lamp 12 is used to emit radiant energy upon being energized by the power source 27. The energy-emitting body or lamp 12 may be sized and shaped to have an opening that surrounds the outer periphery or rim of the open top of container 14, and is accordingly generally annular in shape. In that case, the energy-emitting body will emit radiant energy continuously about a periphery of the opening.

There is also a directing means 30 to direct and concentrate the emitted radiant energy continuously about the perimeter of the open top of the container 14. The directing means 30 is most commonly in the form of a reflective device, and defines an opening in which the container 14 is positioned. The directing means 30 is sized and shaped to direct the emitted radiant energy continuously about a periphery of the opening. This may include, for example, directing the emitted radiant energy inwardly, towards the opening. In this way the radiant energy may be directed to the portion of thin film 20 overhanging the rim of the container 14.

The lamp 12 is preferably a tubular quartz halogen lamp, of the type commonly employed for cookers, range top heaters and the like. An example of this type of commercially available lamp is made by Philips Electronics, Part No. 16701R-FB. However, an aspect of this embodiment of the invention is that the single lamp 12 needs to completely surround the container 14 to effectively seal the entire periphery. At the same time, provision must be made for input leads 32 to provide power from power source 27 to the lamp 12. In many commercially available lamps, such as the Philips model described, there is a spot on the point where input leads 32 enter the quartz envelope that has no filament and hence no radiation output. Accordingly, the design of the lamp 12 must accommodate the input leads 32 without imposing a gap in the continuous path of emitted radiation around the periphery of container 14.

FIG. 3 shows one design of the lamp 12 of the second embodiment of the present invention, the lamp having input leads 32. Electrical power to input leads 32 is turned on and the lamp 12 is energized when the container 14 and thin film 20 enter inside the annular configuration of the lamp. In this figure the lamp 12 is sized and shaped so that the input leads 32 overlap to avoid a gap in emitted radiation. The emitted radiant energy is accordingly continuous about a periphery of the opening defined by the lamp 12 and directing means 30. As can be seen, the portion of the lamp 12 closest to the input leads 32 is offset on either side from the plane of the rest of the lamp 12 to accommodate the overlap. It has been found that the radiation emitted by the offset portion is adequate to seal the corresponding portion of the thin film 20. If desired, the directing means or reflective device 30 may be oriented to better direct and concentrate the emitted radiation emanating from the offset portion.

In FIG. 4 a more conventional lamp such as the Philips model is used, and a second energy-emitting body or halogen bulb 34 is placed in the gap created by the input leads 32. The energy output of bulb 34 is selected to blend in with the overall continuity of radiation, so that the radiation emitted in the gap is approximately the same as that which would be produced in the same space by the larger lamp 12. The emitted radiant energy is accordingly continuous about a periphery of the opening defined by the lamp 12 and directing means 30.

FIG. 5 is a view of this embodiment of the invention in cross section, showing the lamp 12, container 14, and thin film 20. FIG. 5 also shows the directing means 30 in the form of a reflective coating of a portion of the lamp 12. The coating of the lamp 12 may be either on the inside or on the outside of the glass on the outside perimeter of the lamp 12, creating a shape that can effectively and efficiently reflect the radiant energy inward, towards the container 14. Alternatively, the directing means 30 may be a traditional reflective device such as a separate reflective curved shaped mirror around the exterior of the lamp 12. It has been found that a reflective surface formed of gold has provided adequate results, but it can be appreciated that other reflective materials may also be used as long as they efficiently reflect the emitted radiation.

It can be appreciated that, as with the first embodiment, the lamp 12 is in approximately the same position in space relative to the rim of the container 14 as each rotating first radiant energy source was in the Bakker patent described above. The power of the single lamp 12 is preferably in the range of 750–1000 watts, though other power levels that provide adequate results may also be used. In the configuration of FIG. 4, it has been found that for a lamp 12 rated at 1000 watts a bulb 34 of 100 watts provides adequate results.

It can be appreciated that the fixed position of the radiant energy device of the present invention provides an effective means of sealing the open top of a container with, for example, an energy absorbing shrinking thin film, without the expensive and complex equipment required to rotate lamps shown in the prior art. Further, as there are no moving parts and the process is governed by electrical processes and instantly-on halogen lamps, the time required to complete the seal is measurably reduced. As noted, an improvement in speed is a desirable feature in the food service industry.

Yet another benefit of the present invention is that it allows the overall lid-forming device to effectively shrink a rectangular segment or cut piece of thin film around the container rim. This is an advantage in that a piece of thin film may now be cut directly off a roll of thin film and placed on the container without having to be cut in a circular fashion, as required in the prior art. Where an array of lamps are used, the corners of the rectangular thin film can be presented directly adjacent to four of the lamps so that the extra film of the corners can be neatly shrunk, substantially out of sight, around or even under the rim.

It will be appreciated by those skilled in the art that the foregoing description was in respect of preferred embodiments and that various alterations and modifications are possible within the broad scope of the appended claims without departing from the spirit of the invention. For example, with respect to the first embodiment of the invention, while division of the array of lamps into two switched groups has provided adequate results it can be appreciated that three or more groups may also be feasible. Various other modifications will be apparent to those skilled in the art but are not described in any further detail herein.

We claim:

1. A radiant energy device for shrinking a thin film onto an open top of a container, said radiant energy device comprising:

(a) a source of power, to provide power to said radiant energy device;

(b) a plurality of fixed energy-emitting units, each of said units when energized being configured to emit radiant energy towards said shrinking film on said open top of said container, said plurality of fixed energy-emitting units being positioned to define an opening to surround said open top of said container; and (c) a switching means, operatively connected between said source of power and each of said energy-emitting units, to independently activate at least two groups of said energy-emitting units;

wherein, a first group of said energy-emitting units partially shrinks said thin film onto said container, and a second group finishes said shrinking.

2. The radiant energy device according to claim 1, wherein said switching means switches between two groups of said energy-emitting units.

3. The radiant energy device according to claim 1, wherein said switching means switches between more than two groups of said energy-emitting units.

4. The radiant energy device according to claim 1, wherein said device contains at least four fixed energy-emitting units.

5. The radiant energy device according to claim 4, wherein said device contains at least eight fixed energy-emitting units.

6. The radiant energy device according to claim 1, wherein said energy-emitting units are lamps emitting light energy.

7. The radiant energy device according to claim 6, further including reflectors on said energy-emitting units.

8. The radiant energy device according to claim 7, wherein said reflectors are curved surfaces that distribute radiant energy across a segment of said thin film.

9. The radiant energy device according to claim 1, wherein said device is sized and shaped to shrink a segment of thin film having a rectangular shape.

10. A radiant energy device for shrinking a thin film onto an open top of a stationary container, said radiant energy device comprising:

a source of power, to provide power to said radiant energy device;

an energy-emitting body having input leads to accept power from said source of power and emitting radiant energy upon being energized by said source of power, said energy-emitting body being sized and shaped and having overlapping input leads so that said radiation emitted by said energy-emitting body is continuous about a periphery of an opening; and (c) a directing means located around said periphery of said opening, said directing means being sized and shaped to direct said emitted radiant energy continuously towards said periphery of said opening, when said energy emitting body is energized;

wherein, upon said container being placed in said opening, said directed radiant energy shrinks said thin film to cover said open top of said container.

11. A radiant energy device for shrinking a thin film onto an open top of a stationary container, said radiant energy device comprising:

(a) a source of power, to provide power to said radiant energy device;

(b) an energy-emitting body having input leads to accept power from said source of power and emitting radiant energy upon being energized by said source of power, said input leads defining a gap, said energy-emitting body being sized and shaped and further including a second energy-emitting body placed in said gap so that said radiation emitted by said energy-emitting body is continuous about a periphery of an opening; and (c) a directing means located around said periphery of said opening, said directing means being sized and shaped to direct said emitted radiant energy continuously towards said periphery of said opening, when said energy emitting body is energized;

wherein, upon said container being placed in said opening, said directed radiant energy shrinks said thin film to cover said open top of said container.

* * * * *